No. 645,883. Patented Mar. 20, 1900.
W. O. BAILEY.
APPARATUS FOR BEVELING GLASS.
(Application filed Mar. 7, 1898.)
(No Model.) 6 Sheets—Sheet 1.
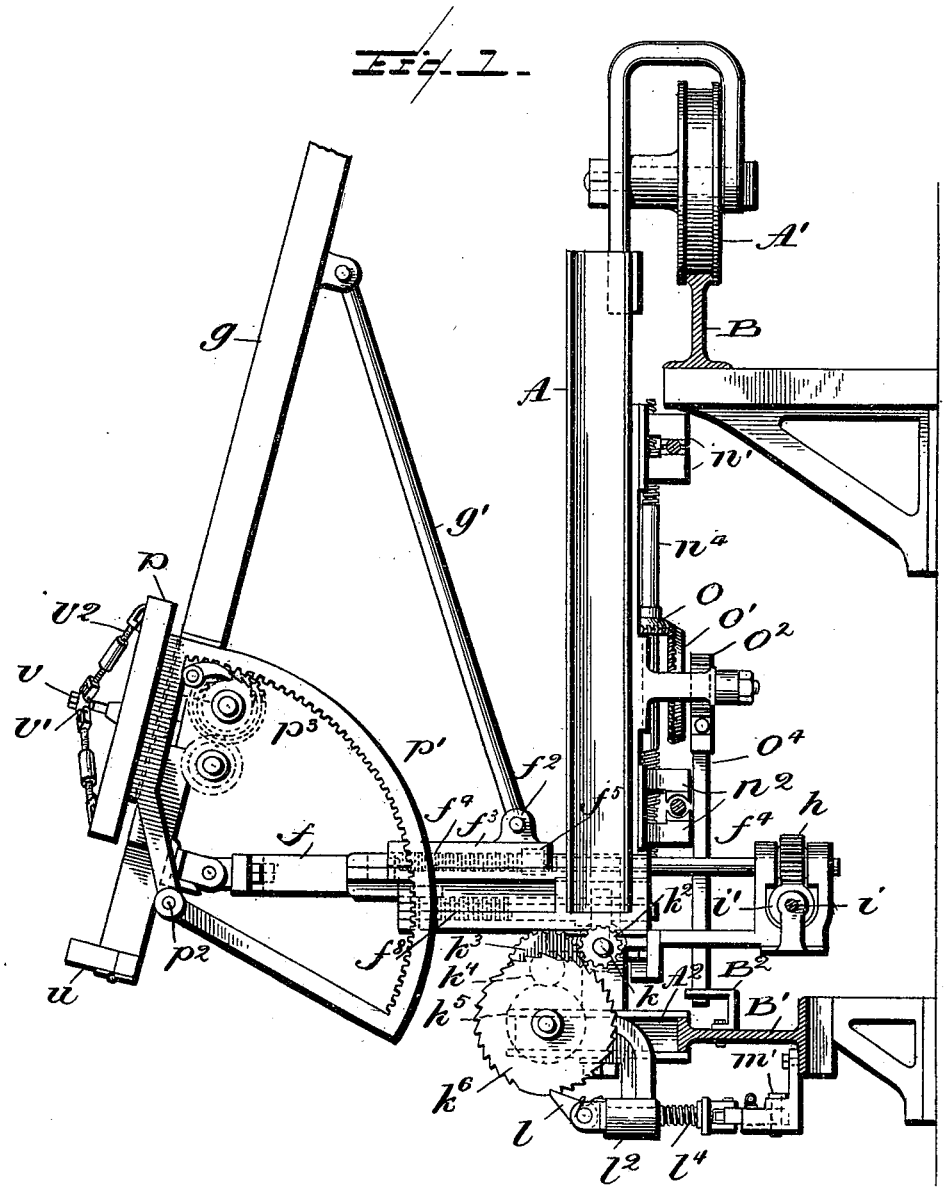
Witnesses
L. C. Hills
Inventor
William O. Bailey
By James L. Norris
Attorney

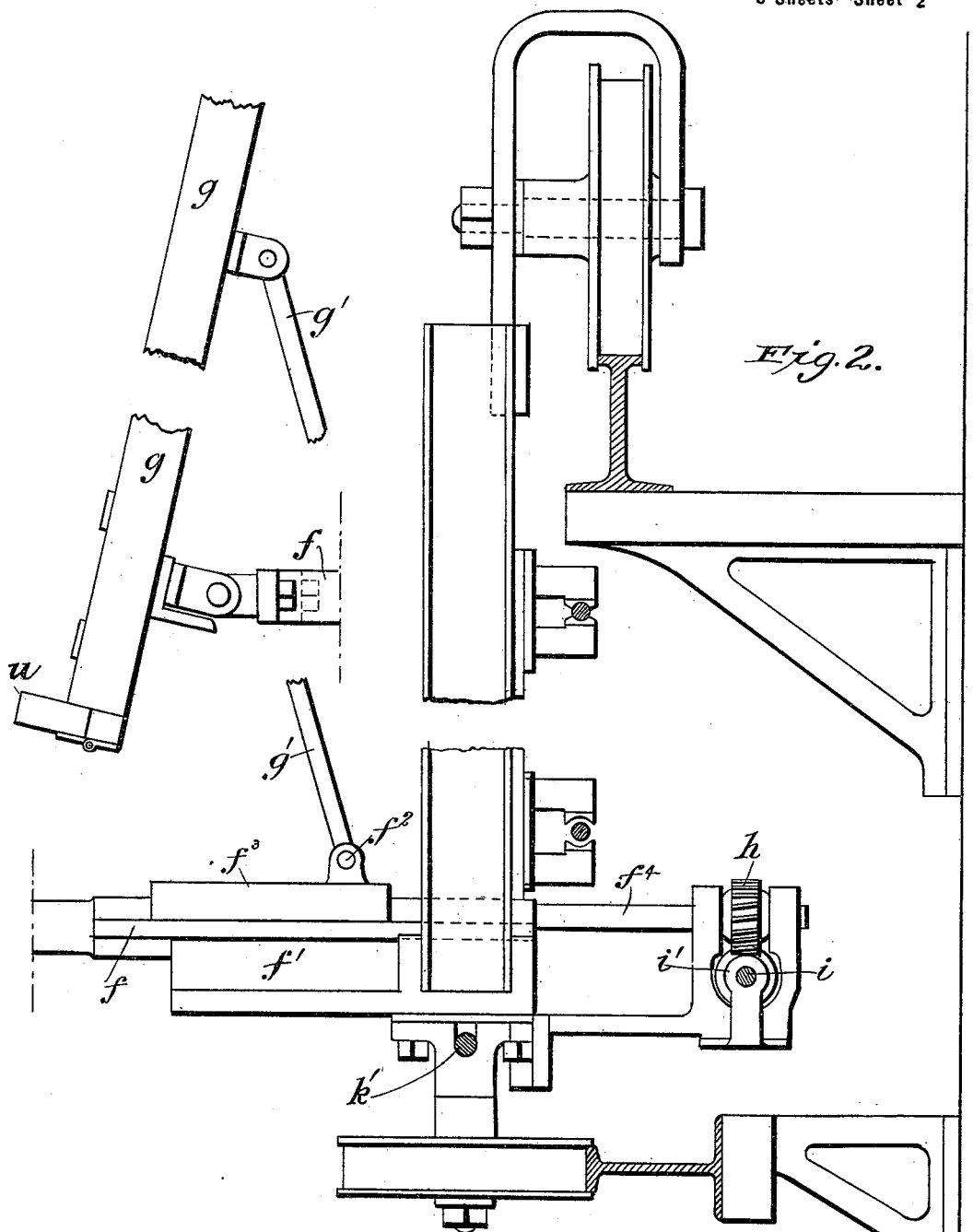

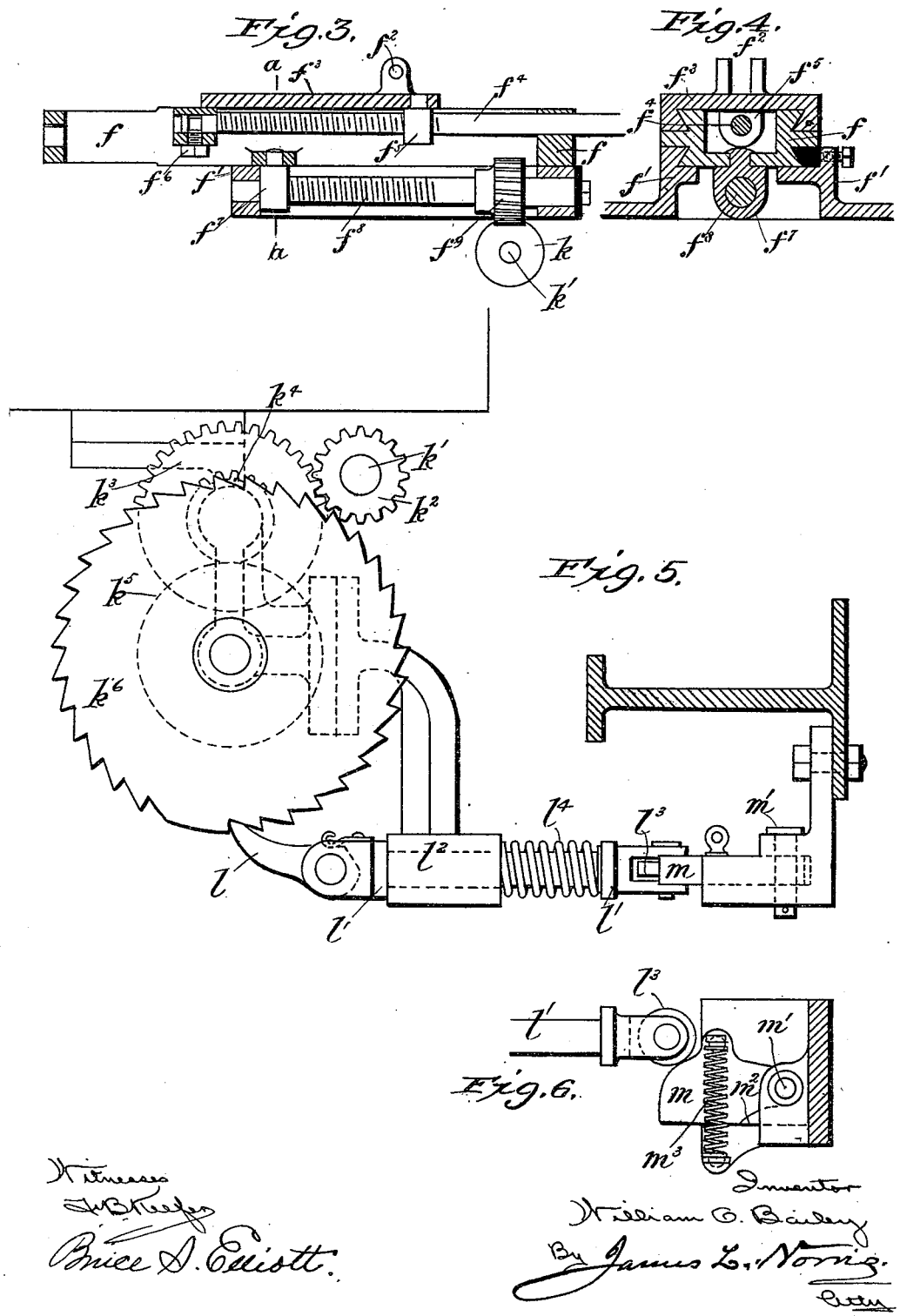

No. 645,883. Patented Mar. 20, 1900.
W. O. BAILEY.
APPARATUS FOR BEVELING GLASS.
(Application filed Mar. 7, 1898.)
(No Model.) 6 Sheets—Sheet 4.
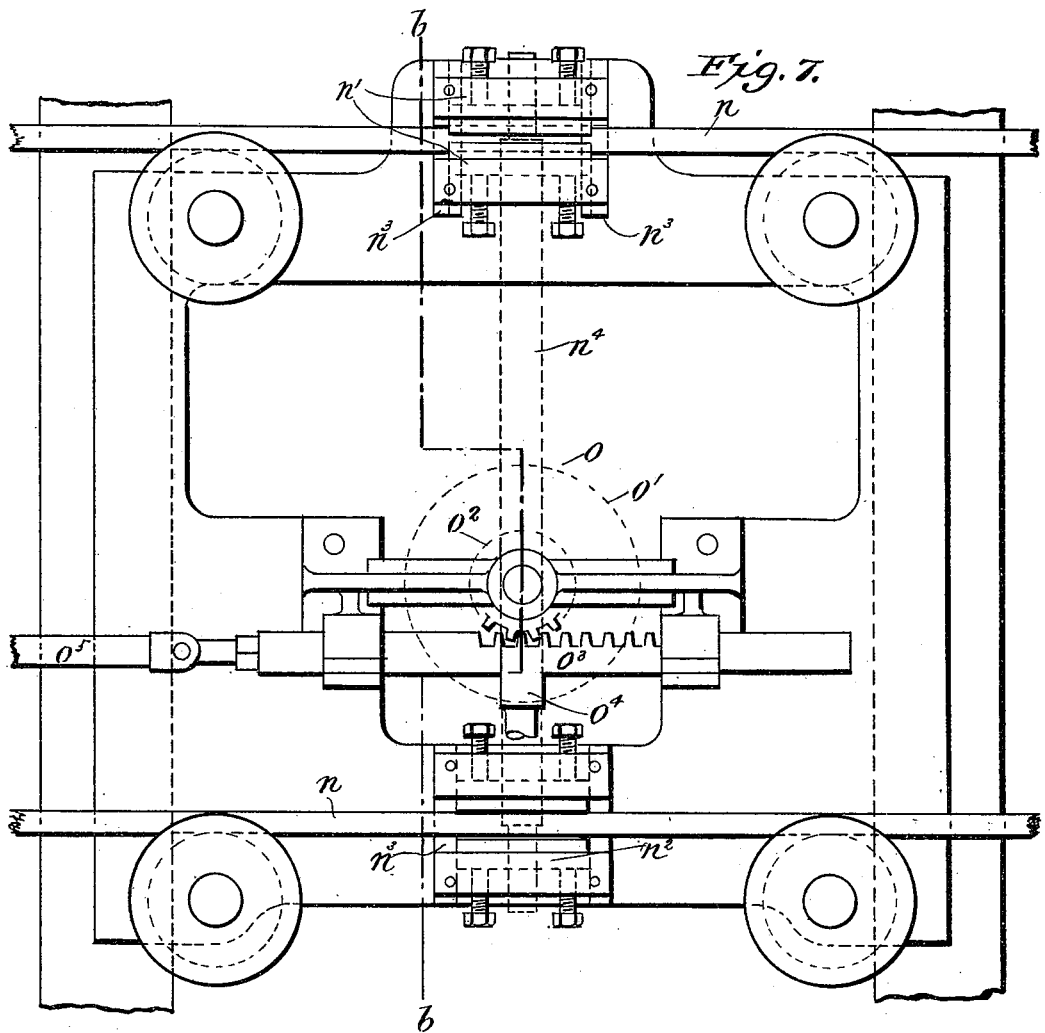

No. 645,883. Patented Mar. 20, 1900.
W. O. BAILEY.
APPARATUS FOR BEVELING GLASS.
(Application filed Mar. 7, 1898.)
(No Model.) 6 Sheets—Sheet 5.
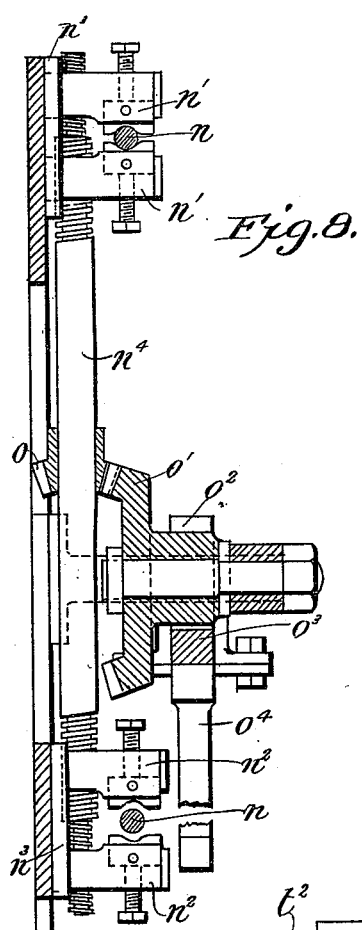
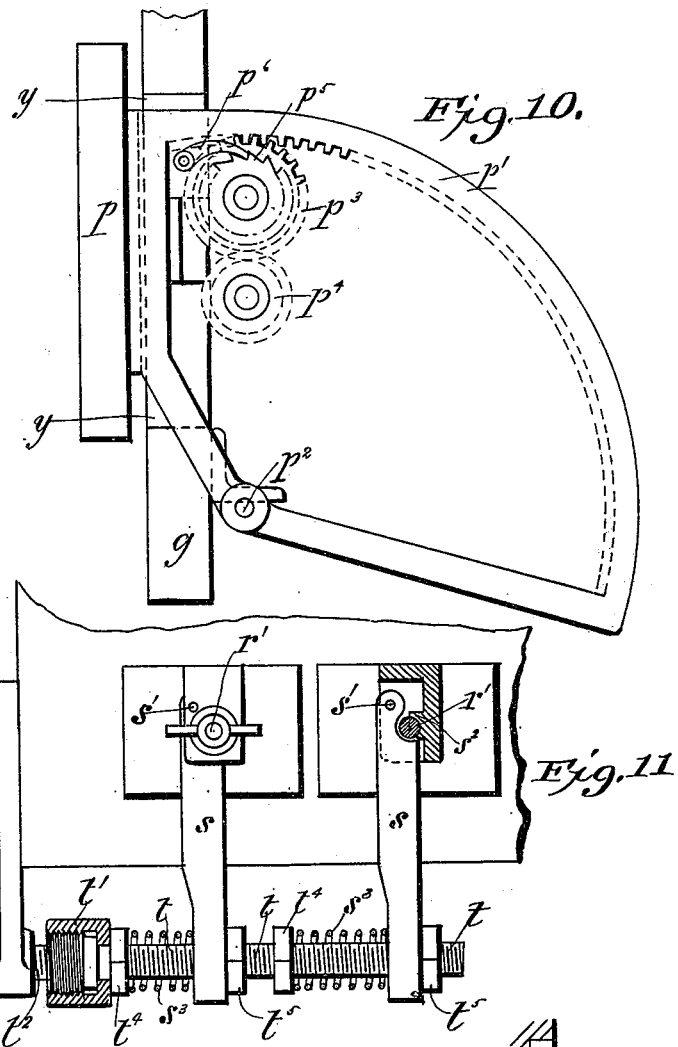
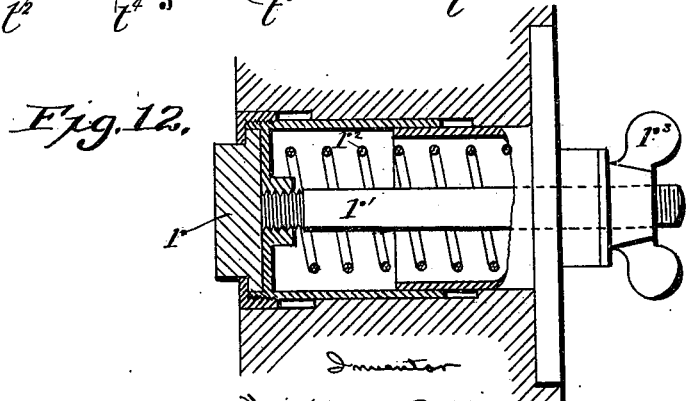

No. 645,883. Patented Mar. 20, 1900.
W. O. BAILEY.
APPARATUS FOR BEVELING GLASS.
(Application filed Mar. 7, 1898.)
(No Model.) 6 Sheets—Sheet 6.
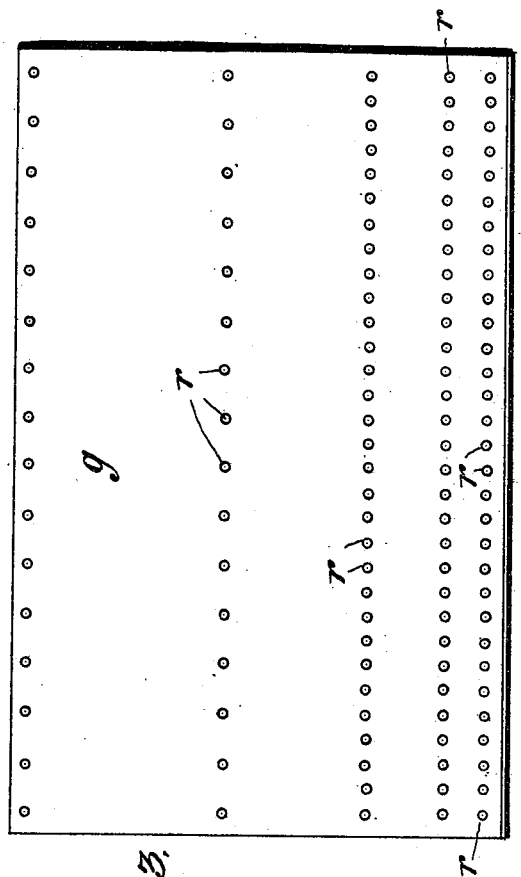
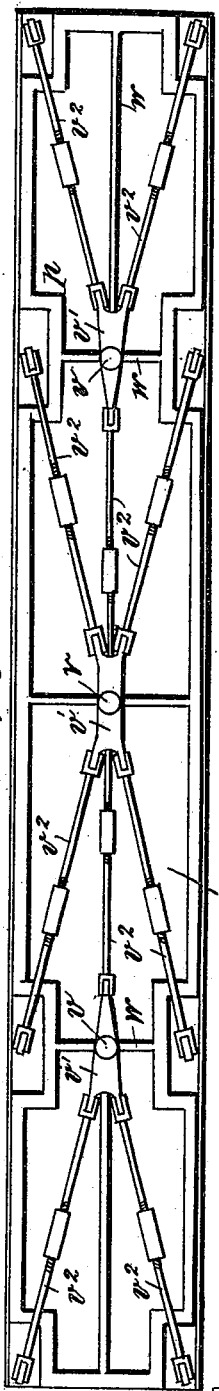
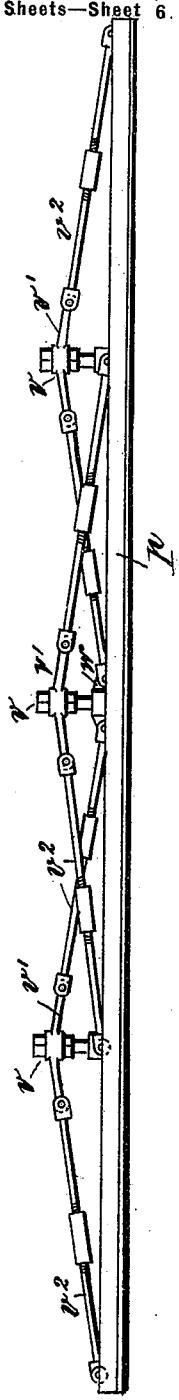
THE NORRIS PETERS CO., PHOTO-LITHO., WASHINGTON, D. C.

UNITED STATES PATENT OFFICE.

WILLIAM OLIVER BAILEY, OF LONDON, ENGLAND.

APPARATUS FOR BEVELING GLASS.

SPECIFICATION forming part of Letters Patent No. 645,883, dated March 20, 1900.

Application filed March 7, 1898. Serial No. 672,951. (No model.)

*To all whom it may concern:*

Be it known that I, WILLIAM OLIVER BAILEY, glass merchant, silverer, and beveler, a subject of the Queen of Great Britain, residing at the Excelsior Works, Wenlock Road, City Road, London, England, have invented certain new and useful Improvements in or Relating to Machines or Apparatus for Beveling Glass, of which the following is a specification.

My invention relates to that class of machines for beveling glass disclosed in British Letters Patent No. 11,382 of 1894 and No. 7,334 of 1895; and it consists in the features and details of construction and combinations of parts which will be hereinafter more fully described and claimed.

In the drawings forming part of this specification, Figure 1 is a side elevation, partly in section, of the complete apparatus. Fig. 2 is an end view of the frame and easel. Fig. 3 is a longitudinal section of the easel-adjusting gear. Fig. 4 is a section on the line $a$ $a$ of Fig. 3. Fig. 5 is an elevation of the feeding mechanism for operating the easel-projecting gear. Fig. 6 is a plan view of a portion of Fig. 5. Fig. 7 is a rear elevation of a part of the frame, illustrating the gripping mechanism. Fig. 8 is a section on the line $b$ $b$ of Fig. 7. Fig. 9 is a detail view. Fig. 10 is a side view of the means for operating the straight-edge or clamping-board. Fig. 11 is a rear view of a portion of the easel, illustrating the means for locking the buffers in position. Fig. 12 is an enlarged sectional view of one of the buffers. Fig. 13 is a front elevation of the easel on a reduced scale. Fig. 14 is an elevation of the clamping-board, and Fig. 15 is a plan view of the same.

In Figs. 2, 3, and 4 is shown the improved arrangement for effecting the adjustment of the easel of the frame (which carries the glass to be beveled) to the required angle of bevel and to the required depth of cut. This consists in combining the projecting mechanism with the angle-adjusting mechanism, whereby the frame is rendered more accurate and generally more satisfactory in use. This I effect by forming each of the usual sliding bars $f$ of a double dovetail and trough section, as shown by Fig. 4, sliding in suitable guides $f'$ on the frame. This bar $f$ carries the easel $g$, hinged thereto at its outer end, Fig. 2, the easel being supported by two or more struts $g'$, jointed to the easel and at $f^2$ to a sliding block $f^3$, capable of sliding on the bar $f$. The sliding block $f^3$ is operated by a threaded rod $f^4$, acting on a lug-nut $f^5$, attached to the block $f^3$, the rod being supported by the bar $f$ and prevented from moving longitudinally therein by the grooved end and bolt $f^6$. The other end of the rod $f^4$ is carried by the frame and is provided with a worm-pinion $h$, in which the rod is free to slide, but prevented from rotating therein by a feather or other suitable means. The worm-pinions $h$ of all the sets of adjusting mechanism are operated by a hand-wheel and shaft $i$, provided with worms $i'$. The bar $f$ is moved longitudinally in its guides by similar mechanism, the lug-nut $f^7$ and screwed rod $f^8$, carrying the worm-pinion $f^9$ fast thereon, being used. The rod $f^8$ is carried by the frame, as shown in Fig. 3, in which figure the angle-adjusting block $f^3$ is shown drawn back and the bar $f$ is shown projected forward. Suitable scale-marks may be cut upon the sliding bars to facilitate the adjustment thereof.

In order that the bar $f$, carrying the easel, may be projected without attention and thus automatically regulate the feed, I provide the mechanism shown by Figs. 5 and 6, in which $k'$ represents the worm-shaft which carries the worms $k$, Fig. 3. This shaft $k'$ is fitted with a toothed pinion $k^2$, gearing with an intermediate toothed wheel $k^3$, formed with a toothed pinion $k^4$. The latter gears with a toothed wheel $k^5$, attached to a ratchet-wheel $k^6$, arranged as shown. The ratchet-wheel is operated by a pawl $l$, mounted at one end of a bar $l'$, capable of sliding in a bracket $l^2$, the other end of the bar being provided with a roller $l^3$ and spring $l^4$. This pawl-bar $l'$ is moved longitudinally by cams fixed to the lower rail on which the frame runs. The cams are arranged as shown in Fig. 6, $m$ being a cam pivoted to a bracket at $m'$ and held against the wall or stop $m^2$ by the spring $m^3$. It will be seen that the cam only acts upon the pawl-bar $l'$ in one direction, the bar $l'$ causing the cam $m$ to yield against the power of the spring $m^3$ when traveling backward.

For propelling the frame across the face or bevel of the mill I employ a continuously-moving endless rope or chain $n$, stretched between adjustable grooved pulleys suitably mounted on the walls of the building, and utilize the opposite moving directions of the upper and lower rope to give corresponding motions to the frame. For this purpose I provide two pairs of jaws $n'$ $n^2$, mounted in suitable guides $n^3$, Figs. 7, 8, and 9, and operate the same by means of a shaft $n^4$, each end of which is cut with a right-hand and a left-hand thread fitting the internal threads of each pair of jaws. (Respectively and clearly shown in Fig. 8.) The shaft is fitted with a bevel-pinion $o$, in gear with a bevel-wheel $o'$, which is integral with the toothed pinion $o^2$, the latter meshing with the sliding rack $o^3$, carrying the arm $o^4$. The rack $o^3$ is also provided with a starting or stopping rod $o^5$, which passes across the back of the frame to a convenient position for use. The arm $o^4$ is operated automatically by suitable projecting stops fixed to the lower rail, so that on the frame arriving at a stop the motion of the arm $o^4$ is arrested, whereby the motion of the frame causes the rack $o^3$ to act on the bevel-gearing $o'$ $o$. This causes one or other of the pairs of jaws to grip either the upper or lower rope or chain, whereby the necessary reciprocating motion of the frame is obtained.

The glass plates are held on the easel by a clamping-board or straight-edge $p$, carried by a pair of quadrants $p'$, Fig. 10, pivoted at $p^2$ at each end of the easel $g$. The quadrants are toothed, as shown, and gear with toothed wheels $p^3$, mounted on one shaft. One of the wheels $p^3$ gears with a pinion $p^4$, suitably mounted on the easel, the pinion $p^4$ being operated by a crank-handle, or the crank-handle may operate the wheel $q^3$ direct. The toothed wheel $p^3$ is integral with a ratchet-wheel $p^5$, and a pawl $p^6$ is provided to prevent the backward rotation of the toothed wheel $p^3$ and consequent falling away of the clamping-board.

The easel $g$, over the front of which a thin sheet of rubber is hung, is provided with a number of rubber buffers $r$, mounted on stems $r'$, passing through the easel and pressed outward by springs $r^2$, as shown in Figs. 12 and 13, the latter figure illustrating the positions of the buffers on the easel with the rubber covering removed and the former showing the construction of the buffers. $r^3$ represents a fly-nut for adjusting the projection of the buffer from its case. The lowest row of buffers are capable of being locked to prevent the springs yielding after the glass has been clamped in position. This I effect by providing at the back of the easel a lock for each of the buffers. (Shown in Fig. 11.) It consists of a lever $s$, pivoted to the case at $s'$ and arranged to grip the stem $r'$ of the buffer $r$ between it and the correspondingly-curved surface $s^2$ of the lock-case. All the levers (of which there are as many as there are buffers in the lowest row) are forked at their lower ends and straddle the rod $t$, swivel-jointed at $t'$ to a threaded shaft $t^2$, carried by the bracket $t^3$, which is correspondingly screw-threaded, the shaft carrying a hand-wheel (not shown) for rotating same. The rod $t$ is also screw-threaded and fitted with nuts $t^4$, between which and the forked end of the levers $s$ the springs $s^3$ are fitted, the nuts $t^4$ permitting the adjustment of the pressure of the springs against the lever $s$, thereby insuring sufficient and simultaneous pressure on all the levers $s$. $t^5$ are collars arranged to release the gripping action by pulling off the levers $s$ when the shaft $t^2$ is rotated in an opposite direction to that which causes the gripping action.

The clamping-board $p$ is formed with its inner face rubber-covered and perfectly level, so that when the glass is clamped between it and the easel the outer surfaces of the glass plates are all truly level, the spring-buffers $r$ pressing all the glass plates against the clamping-board and in which position the lowest row of buffers is fixed by the locking mechanism previously described. By these means the various thicknesses of glass are accommodated and rendered capable of being operated upon simultaneously. The lower edge of the easel $g$ is provided with a rail or ledge $u$, hinged thereto, which is used to temporarily support the glass on the easel when the clamping-board is removed.

In order to insure the clamping-board being as nearly as possible level, I form the outer side as shown in Figs. 14 and 15. As will be readily understood, $v$ are straining-bolts carrying caps or plates $v'$, to which are jointed the adjustable links $v^2$. Any number of sets of straining-bolts and links may be used to gain the desired end, and webs or ribs, such as $w$, may also be employed to add additional stiffness. The block or roller $y$, Fig. 10, is arranged between the easel and the quadrant $p'$, so that when the clamping-board $p$ is being forced against the glass to clamp the same the quadrants are prevented from straining inward toward each other, and thus prevent bowing of the clamping-board.

I claim—

1. In a glass-beveling machine, the combination with a traveling frame, of bars mounted to slide thereon, an easel pivoted to the bars, blocks mounted to slide on said bars, connections between said easel and said blocks, and means for moving said bars and blocks independently.

2. In a glass-beveling machine, the combination with a traveling frame, of bars mounted to slide in guides thereon, an easel pivoted to the bars, blocks mounted to slide on said bars, struts pivoted to said easel and to said blocks, and screw-shafts and worm-pinions for moving said bars and blocks independently.

3. In a glass-beveling machine, the combination with a stationary part and a cam thereon, of a traveling frame, bars mounted to slide thereon carrying an easel, a ratchet operating through suitable connections to move said bars, a pawl engaging said ratchet for operating it, and a bar carrying said pawl and adapted to engage said cam, as and for the purpose set forth.

4. In a glass-beveling machine, the combination with a stationary part, of a cam pivoted thereto, a stop for limiting the movement of said cam in one direction, a spring for resisting its movement in the opposite direction, a traveling frame, bars mounted to slide thereon carrying an easel, a ratchet connected through suitable gearing with said bars, a pawl engaging said ratchet for operating it, and a bar carrying said pawl and adapted to engage said cam, as and for the purpose set forth.

5. In a glass-beveling machine, the combination with a traveling frame, of gripping devices thereon, oppositely-movable strands of cable adapted to be engaged by said gripping devices, and means for throwing one of said devices into locking position and simultaneously releasing the other.

6. In a glass-beveling machine, the combination with a traveling frame, of gripping devices thereon, oppositely-movable strands of cable adapted to be engaged by said gripping devices, and means for automatically throwing one of said devices into locking position and simultaneously releasing the other.

7. In a glass-beveling machine, the combination with a traveling frame, of gripping devices thereon, oppositely-movable strands of cable adapted to be engaged by said gripping devices, a pair of stops on a stationary part, and tripping mechanism carried by said frame and adapted to engage said stops for throwing one of said devices into locking position and simultaneously releasing the other.

8. In a glass-beveling machine, the combination with a traveling frame, of two sets of gripping-jaws thereon, oppositely-movable strands of cable adapted to be engaged by said jaws, an oscillatory shaft provided with means for operating said jaws to simultaneously open one set and release the other, and means for automatically actuating said shaft.

9. In a glass-beveling machine, the combination with a traveling frame for supporting the glass, of two pairs of jaws thereon, a propelling rope or cable between the members of each pair of jaws, a shaft having right and left hand screw-threads engaging respectively the separate members of each pair of jaws, a pinion on said shaft, a gear-wheel meshing therewith, a pinion secured to said gear-wheel, a rack gearing with the latter pinion, and means for moving said rack.

10. In a glass-beveling machine, the combination with a traveling frame for supporting the glass, of two pair of jaws thereon, a propelling rope or cable between the members of each pair of jaws, a shaft having right and left hand screw-threads thereon engaging respectively the separate members of each pair of jaws, a pinion on said shaft, a gear-wheel meshing therewith, a pinion secured to said gear-wheel, a rack gearing with the latter pinion having an arm thereon, and fixed stops adapted to be engaged by said arm, as and for the purpose set forth.

11. In a glass-beveling machine, the combination with an easel and a clamping-board coöperating therewith, of spring-actuated buffers on one of said parts.

12. In a glass-beveling machine, the combination with an easel and a clamping-board coöperating therewith, of spring-actuated buffers extending through openings in said easel and opposing the movement of said clamping-board.

13. In a glass-beveling machine, the combination with an easel and a clamping-board coöperating therewith, of spring-actuated buffers extending through openings in said easel and means for locking a part of said buffers.

14. In a glass-beveling machine, the combination with an easel and a clamping-board coöperating therewith, of spring-actuated buffers extending through openings in said easel, and means for controlling the degree of penetration of said buffers through said openings.

15. In a glass-beveling machine, the combination with an easel and a clamping-board coöperating therewith, of a yielding buffer thereon comprising a rubber tip projecting through an opening in the easel, a stem secured thereto, a spring surrounding said stem, and a screw-nut upon the outer end thereof.

16. In a glass-beveling machine, the combination with an easel, of a series of yielding buffers thereon, stems on said buffers, and clamping devices for said stems.

17. In a glass-beveling machine, the combination with an easel, of a series of yielding buffers thereon, stems on said buffers, clamping devices for said stems, and means for actuating said clamping devices simultaneously.

18. In a glass-beveling machine, the combination with an easel, of spring-actuated buffers thereon, stems on said buffers, fixed gripping-surfaces, levers for clamping said stems against said surfaces, and means for operating said levers simultaneously.

19. In a glass-beveling machine, the combination with an easel, of spring-actuated buffers thereon, stems on said buffers, fixed gripping-surfaces, levers for clamping said stems against said surfaces, an internally-threaded bracket, a threaded shaft extending therethrough, a threaded rod swiveled to said shaft, collars on said rod adapted to engage said levers on one side, springs on said rod adapted to engage said levers on the other side, and adjusting-nuts for said springs.

20. In a glass-beveling machine, the combination with an easel, of a clamping-board coöperating therewith, the latter being provided with the straining-bolts $v$, the caps or plates $v'$, the adjustable links $v^2$ and the webs $w$.

21. In a glass-beveling machine, the combination with an easel, of a clamping-board coöperating therewith, internally-toothed quadrants secured to said board and pivoted to said easel, gear-wheels mounted on a common shaft meshing with the teeth on said quadrants, and means for rotating said shaft.

22. In a glass-beveling machine, the combination with an easel, of a clamping-board coöperating therewith, internally-toothed quadrants secured to said board and pivoted to said easel at its opposite ends, gear-wheels meshing with the teeth on said quadrants, means for rotating said gear-wheels, and a block or roller mounted on the edge of said easel for preventing inward straining of the quadrants or bowing of the clamping-board.

In testimony whereof I have hereunto set my hand in presence of two subscribing witnesses.

WILLIAM OLIVER BAILEY.

Witnesses:
GEORGE C. DOWNING,
W. I. SKERTEN.